US011065625B2

(12) United States Patent
Little et al.

(10) Patent No.: US 11,065,625 B2
(45) Date of Patent: Jul. 20, 2021

(54) AUGER FOR GRINDING POLYURETHANE FOR A TIRE FILLING MACHINE

(71) Applicant: CARLISLE CONSTRUCTION MATERIALS, LLC, Carlisle, PA (US)

(72) Inventors: Jeff Little, Rossville, GA (US); John Bishop, DuBois, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 16/988,108

(22) Filed: Aug. 7, 2020

(65) Prior Publication Data
US 2021/0078011 A1 Mar. 18, 2021

Related U.S. Application Data

(60) Provisional application No. 62/899,925, filed on Sep. 13, 2019.

(51) Int. Cl.
| *B02C 19/22* | (2006.01) |
| *B02C 18/18* | (2006.01) |
| *B29D 30/04* | (2006.01) |
| *B60C 7/10* | (2006.01) |
| *B60C 19/12* | (2006.01) |

(Continued)

(52) U.S. Cl.
CPC ............. *B02C 19/22* (2013.01); *B02C 18/18* (2013.01); *B29B 17/0412* (2013.01); *B29D 30/04* (2013.01); *B29B 2017/0448* (2013.01); *B29K 2075/00* (2013.01); *B29K 2105/26* (2013.01); *B29L 2030/00* (2013.01); *B60C 7/10* (2013.01); *B60C 19/12* (2013.01)

(58) Field of Classification Search
CPC ......... B02C 18/06; B02C 18/18; B02C 18/24; B02C 18/141; B02C 19/22; B02C 19/12; B29B 17/0412; B29B 2017/0448; B29K 2075/00; B29K 2105/26; B29L 2030/00; B60C 7/10
See application file for complete search history.

(56) References Cited

U.S. PATENT DOCUMENTS 2,985,211 A * 5/1961 Letz ..................... B02C 19/22
241/167
4,142,689 A * 3/1979 Kemp, Jr. ............ B02C 18/141
198/666

(Continued)

OTHER PUBLICATIONS

International Searching Authority, International Search Report and Written Opinion for corresponding International Application No. PCT/US2020/045434, dated Oct. 20, 2020, 8 pages.

*Primary Examiner* — Adam J Eiseman
*Assistant Examiner* — Mohammed S. Alawadi
(74) *Attorney, Agent, or Firm* — David R. Heckadon; Gordon Rees Scully Mansukhani LLP

(57) ABSTRACT

An auger for a grinder material for a tire filling machine, having: a cylindrical column; and a plurality of flights extending outwardly from the cylindrical core, wherein (i) the flights are arranged in pairs extending radially outwards from the cylindrical column at 180 degrees to one another, and (ii) each flight has a sharpened leading edge. Each pair of flights are positioned at angles of approximately 50 or 60 degrees to one another, and each flight extends approximately half way around the circumference of the cylindrical column, and there are no outer edge notches in the flights.

12 Claims, 7 Drawing Sheets

(51) Int. Cl.
  *B29B 17/04*   (2006.01)
  *B29L 30/00*   (2006.01)
  *B29K 75/00*   (2006.01)
  *B29K 105/26*   (2006.01)

(56) References Cited

U.S. PATENT DOCUMENTS

| | | | | |
|---|---|---|---|---|
| 5,052,630 | A | * 10/1991 | Hinsey | ............ B02C 18/146 |
| | | | | 241/36 |
| 5,601,239 | A | * 2/1997 | Smith | ............ B02C 19/22 |
| | | | | 241/260.1 |
| 2002/0020479 | A1 | 2/2002 | Shaffer | |
| 2004/0238983 | A1* | 12/2004 | Mikoshiba | ...... B29B 17/0036 |
| | | | | 264/37.1 |
| 2010/0284236 | A1 | 11/2010 | Franz et al. | |
| 2020/0047228 | A1* | 2/2020 | Kivioja | ............ B09B 3/00 |

\* cited by examiner

AUGER FOR GRINDING POLYURETHANE FOR A TIRE FILLING MACHINE

RELATED APPLICATION

The present application claims priority to U.S. Provisional Patent Application, Ser. No. 62/899,925, filed Sep. 13, 2019, of same title, the entire disclosure of which is incorporated herein by reference in its entirety for all purposes.

TECHNICAL FIELD

The present invention relates to augers for grinding polyurethane rubber (such as recycled tires) into small bits that can then be combined with virgin rubber to provide a flatproofing material that can be injected into tires.

BACKGROUND OF THE INVENTION

Examples of the Applicant's tire filling systems can be found in U.S. Pat. Nos. 6,988,524 and 6,918,979, incorporated herein by reference. FIG. 1 shows the Applicant's pre-existing auger 1 that was used to grind recycled polyurethane tires (which is later combined with virgin rubber to be used as a tire-filling and flatproofing material).

The Applicant's pre-existing auger 1 comprises a large central cylinder 2 with relatively short flights extending therefrom. Specifically, the large central cylinder extends approximately 60% or 70% of the full diameter to the edges of the flights 3. In addition, the outer edges of the flights 3 have notches 4 therein such that a portion of the outer edges of the flights 3 are cut away. As can also be seen in FIG. 1, flights 3 are not arranged in pairs extending radially outwardly from opposite sides of the central cylinder. Recently, a new tougher material has been introduced to the market and it would be desirable to use this new material in tire refilling operations. The old material was cured virgin material and/or a blend of cured virgin polyurethane and used polyurethane. The new tougher material is a blend of virgin polyurethane and crumb rubber granules in varying percentages and/or harder shore formulations (e.g. Hevi-duty™ variant circa 50 shore A), again in either virgin based or when blended with rubber crumb granules in varying percentages. This new material has proven very difficult to grind up using the existing auger 1. Specifically, attempting to grind the new material with the existing auger 1 has typically damaged the auger, or its motor or gears. As such, this new material must typically be discarded into landfills. It would instead be desirable to provide a new auger design that is specifically suitable for work with this new material. The present auger's novel shape and design solves this problem.

SUMMARY OF THE INVENTION

The present system provides an auger for a grinder for a tire filling machine, comprising: a cylindrical column, and a plurality of flights extending outwardly from the cylindrical core. Importantly, (i) the flights are arranged in pairs extending radially outwards from the cylindrical column at 180 degrees to one another, and (ii) each flight has a sharpened leading edge.

In preferred aspects, each pair of flights extends approximately half way around the circumference of the cylindrical column and the sharpened leading edges (and the trailing edges) of each pair of flights are positioned at 180 degrees to one another. Preferably, there are no outer edge notches in the flights.

In preferred aspects, successive pairs of flights are positioned at angles around the central cylindrical column of approximately 50 or 60 degrees to one another. As such, three successive pairs of flights together completely extend around the cylindrical column such that the entire circumference of the cylinder is covered by three successive pairs of flights. In preferred embodiments, the auger comprises 2 sets of 3 of these pairs of flights. As such, the present auger may include at least 12 sharpened leading edges.

In preferred aspects, the present auger had a relatively smaller central cylinder and relatively larger flights (as compared to the pre-existing auger 1 design). In one preferred embodiment, the ratio of the outer diameter of the cylindrical column to the outer diameter of the flights is 0.45 to 0.65.

DETAILED DESCRIPTION OF THE FIGURES

As stated in the Background Section above, the present auger was designed to function well with grinding the new tougher material. As such, the present auger involved a number of non-obvious design changes from the Applicant's pre-existing auger (seen in FIG. 1). When designing the present auger, the Applicant performed numerous design tests and experiments. A large number of factors had to be re-designed, and these new features had to be tested together. Altering any one design factor had an impact on the other design factors. All of these changes needed to be balanced off against one another, and multiple iterations of the present auger design had to be performed to achieve the final design.

For example, variables including, but not limited to, the following all had to be simultaneously designed, tested, and balanced off against one another:

(a) the diameter of cylindrical column vs. the diameter of flights;
(b) the radial position of the flights around the cylindrical column, and how far each of the flights extend around the cylindrical column;
(c) the number of flights that are to be positioned around the cylindrical column;
(d) the distance the flights extend along the length of the cylindrical column;
(e) the thickness of the flights;
(f) the presence or absence of notches in the flights;

(g) the overlap (or underlap) of the flights around the cylindrical column;
(h) the angle of attack of the flights;
(i) the presence or absence of sharpened leading edges of the flights; and
(j) the axial separation distances between the flights, and whether these distances are uniform or vary along the axial length of the cylindrical column.

Figure 2:
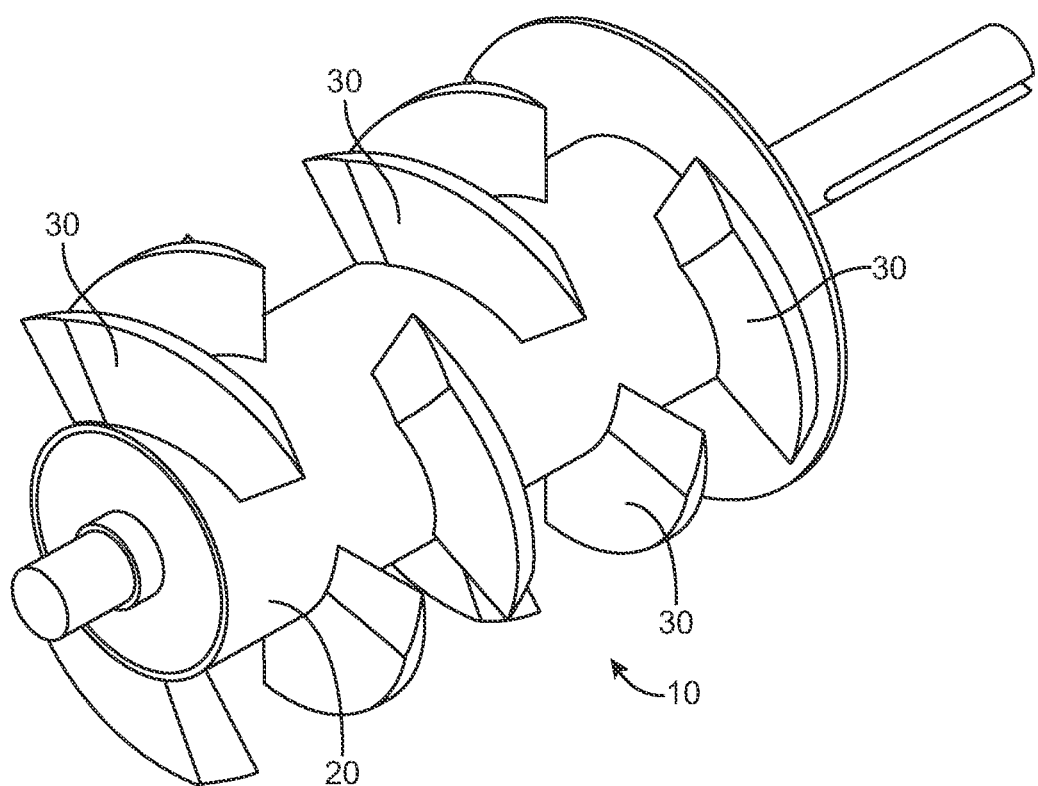
FIG. 2 is a front perspective view of the present auger.
Figure 3:
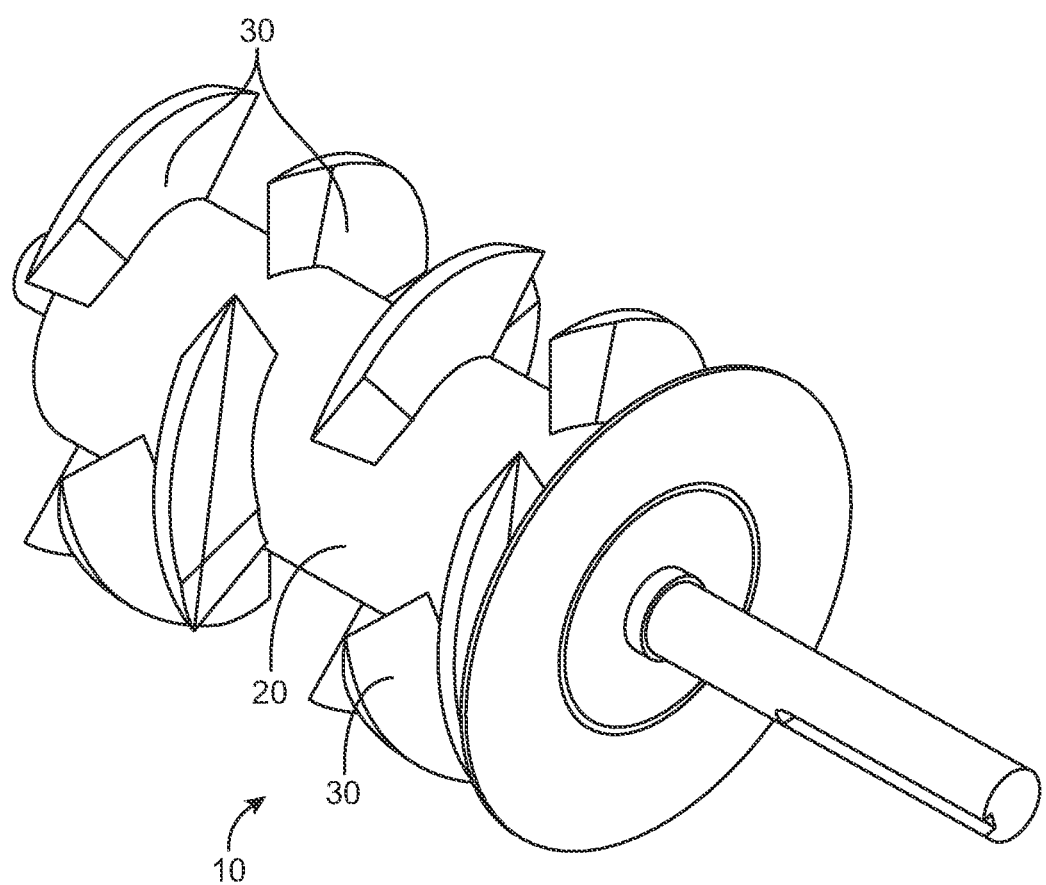
FIG. 3 is a rear perspective view of the present auger.

As best seen in FIGS. 2 and 3, the present auger 10 for a grinder for a tire filling machine is provided. Auger 10 comprises: a cylindrical column 20; and a plurality of flights 30 extending outwardly from the cylindrical core.

Figure 4:
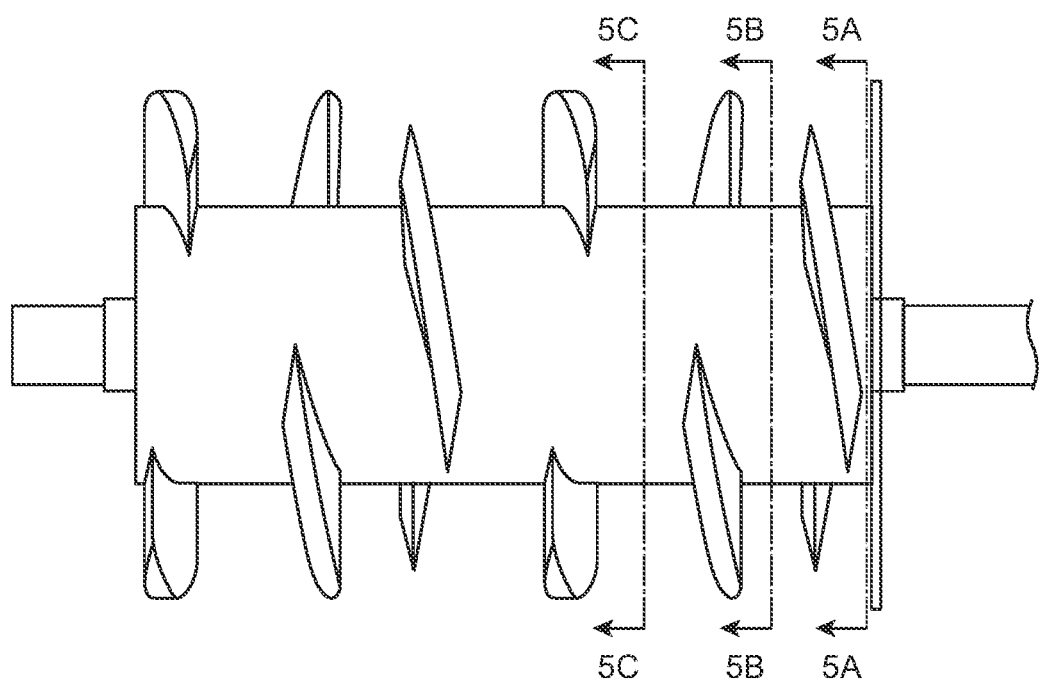
FIG. 4 is a side elevation view of the present auger.
Figure 5C:
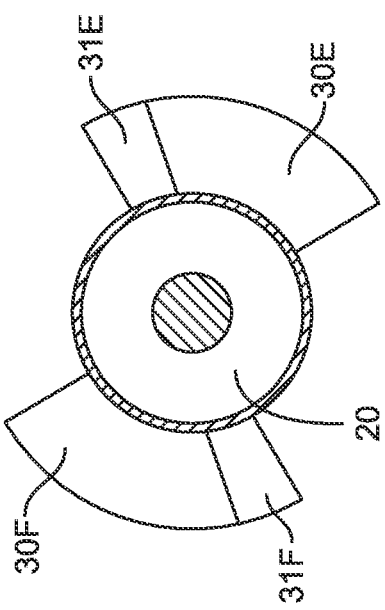
FIG. 5C is a sectional view taken along line 5C-5C in FIG. 4.
Figure 5B:
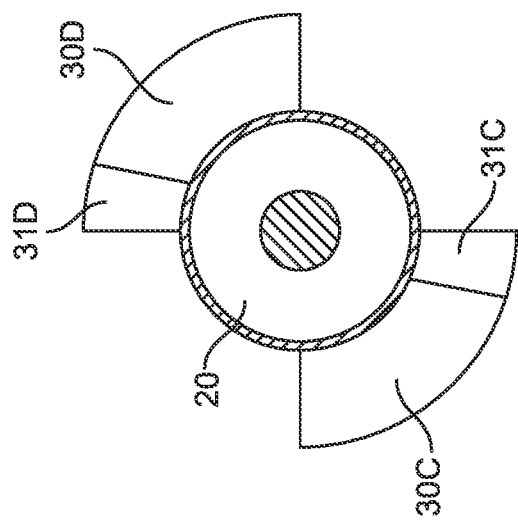
FIG. 5B is a sectional view taken along line 5B-5B in FIG. 4.
Figure 5A:
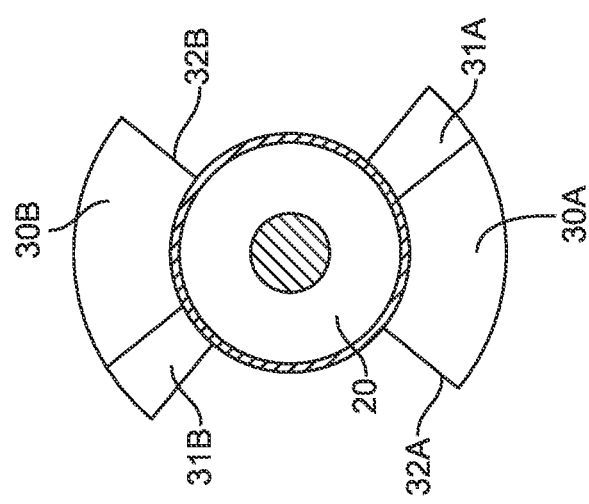
FIG. 5A is a sectional view taken along line 5A-5A in FIG. 4.

Flights 30 are arranged in pairs extending radially outwards from the cylindrical column at 180 degrees to one another. For example, as seen in FIGS. 4 to 5C, flights 30A and 30B are positioned opposite to one another. Similarly, flights 30C and 30D are positioned opposite to one another. Similarly, flights 30E and 30F are positioned opposite to one another. Each flight 30 has a sharpened leading edge 31A, 31B, 31C, 31D, 31E and 31F.

As can also be seen, each pair of flights extends approximately half way around the circumference of the cylindrical column. For example, flights 30A and 30B together extend ½ way around cylinder 20. As such the sharpened leading edges of each pair of flights (e.g.: 31A and 31B) are positioned at 180 degrees to one another. Moreover, trailing edges 32A and 32B are also positioned at 180 degrees to one another.

Figure 1:
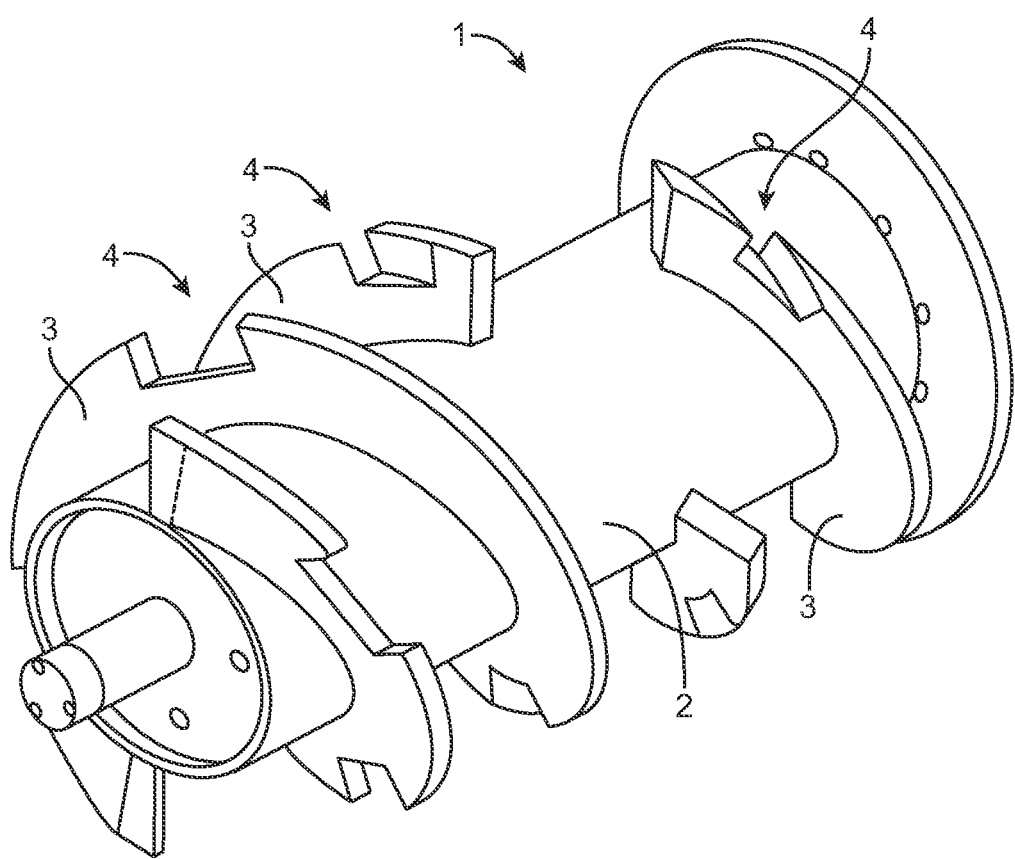
FIG. 1 is a perspective view of the Applicant's pre-existing auger.

Preferably, there are no outer edge notches in the flights (in contrast to notches 4 in the pre-existing design shown in FIG. 1). As such, each flight 30 extends fully to the same radial distance away from the center of cylindrical column 20 around its entire circumference.

FIG. 4 shows the relative positions of the pairs of flights 30 around the circumference of cylinder 20. As seen by comparing FIGS. 4, 5A, 5B and 5C, successive pairs of flights (i.e.: 30A/30B is a first pair, and 30C/30D being the second pair) are positioned at angles of approximately 50 or 60 degrees to one another. As a result, only three successive pairs of flights are needed to completely extend around cylindrical column 20 such that the entire circumference of the cylinder 20 is covered by these three successive pairs of flights 30.

As can also be seen in FIG. 4, auger 10 may comprise two sets of these three pairs of flights. In other words, the sectional views 5A-5A, 5B-5B and 5C-5C are repeated twice on FIG. 4. As such, auger 10 may have twelve sharpened leading edges 31. This provides excellent cutting advantages that were simply not possible with the pre-existing auger 1 of FIG. 1.

In addition, in preferred aspects, the diameter of cylinder 20 is small as compared to the full outer diameter of flights 30. This offer the advantage of a greater internal work volume for performing the grinding operation. In optional preferred aspects, the ratio of the outer diameter of the cylindrical column 20 to the outer diameter of the flights 30 is 0.45 to 0.65.

Figure 6:
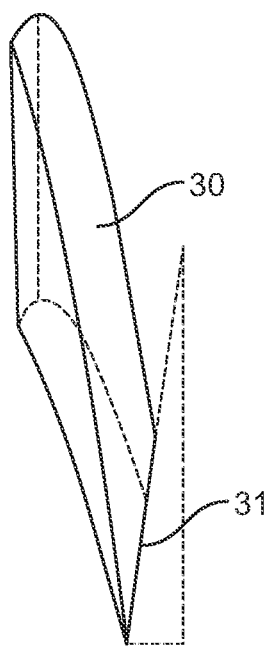
FIG. 6 illustrates the sharpened leading edge of one of the flights.

Lastly, FIG. 6 shows an example of a sharpened leading edge 31 that is cut with a 1:7 blade edge. This sharpness also provides excellent cutting advantages that were simply not possible with the pre-existing auger.

In preferred embodiments, auger 10 is made of T1 armored steel giving extra strength advantages that were not possible with the pre-existing stainless steel auger.

Figure 7:
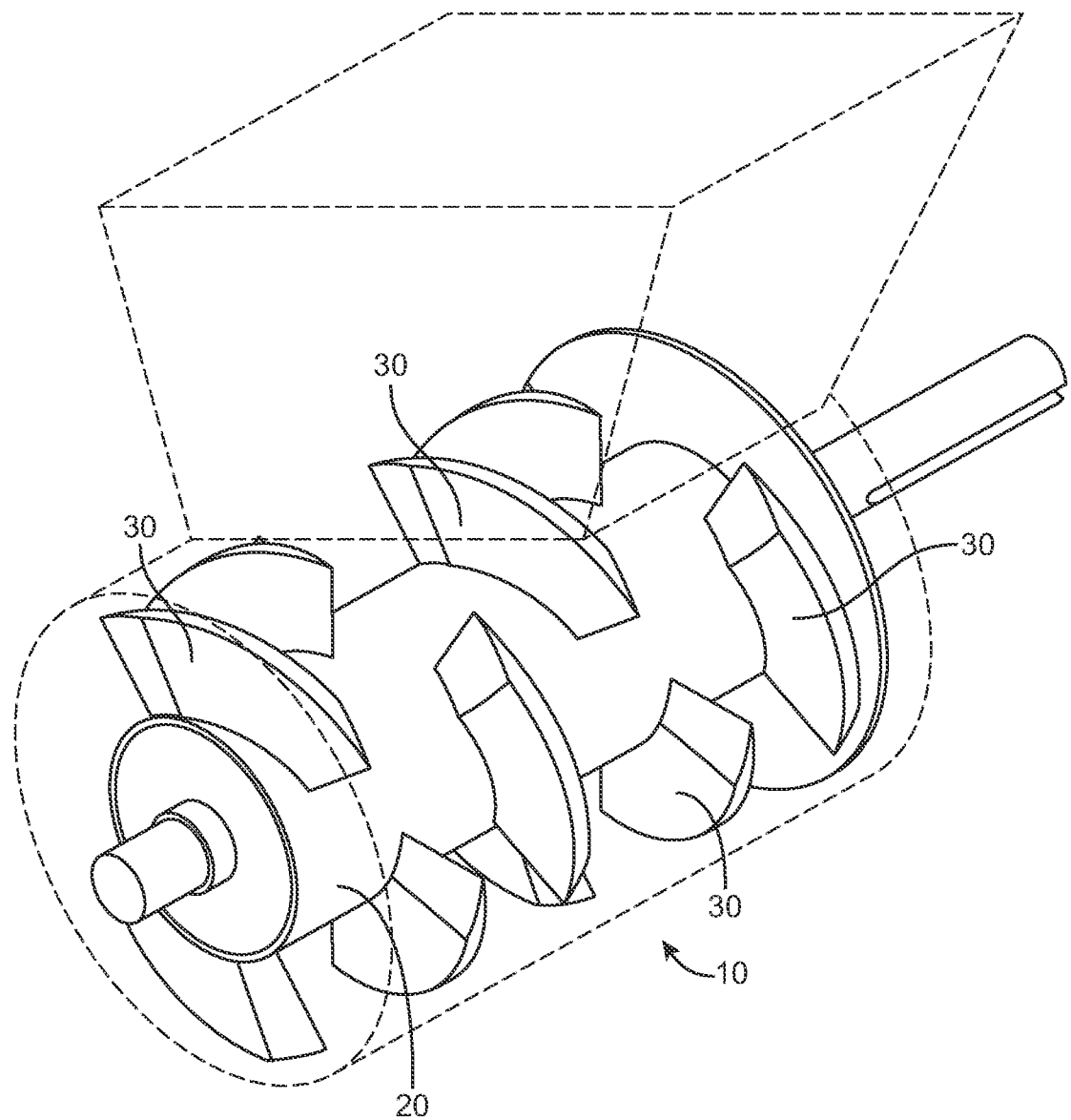
FIG. 7 is an illustration of present auger positioned within the housing of main grinder.

FIG. 7 is an illustration of the present auger positioned in the housing of a main grinder assembly as described in U.S. Pat. No. 6,988,542 (Published Application 2002/0020351), incorporated herein by reference in its entirety for all purposes. The main grinder assembly is shown in dotted lines for ease of illustration (i.e.: such that the present auger can be clearly viewed).

What is claimed is:

1. A grinding system for grinding polyurethane, comprising:
a single auger for a grinder for a tire filling machine wherein the single auger both grinds polyurethane and transports ground polyurethane, the single auger comprising:
a cylindrical column having a first end and a second end; and
a repeating pattern of three flight pairs extending outwardly from the cylindrical column, wherein
(i) the flights are arranged in pairs extending radially outwards from the cylindrical column at 180 degrees to one another, and
(ii) each flight has a sharpened leading edge and a trailing edge in a rotational direction,
wherein the sharpened leading edge of each flight is disposed closer to the first end of the cylindrical column and the trailing edge of each flight is disposed closer to the second end of the cylindrical column, and
(iii) all of the flights twist in the same longitudinal direction;
a cylindrical housing around the bottom and sides of the auger, wherein clearance distances between the bottom and sides of the auger and the cylindrical housing therearound are dimensioned to grind the polyurethane therein;
an input section on the cylindrical housing, the input section being positioned above the auger; and
a screen plate at a forward end of the cylindrical housing.

2. The auger of claim 1, wherein each pair of flights extends approximately half way around the circumference of the cylindrical column.

3. The auger of claim 1, wherein the sharpened leading edges of each pair of flights are positioned at 180 degrees to one another.

4. The auger of claim 1, wherein the trailing edges of each pair of flights are positioned at 180 degrees to one another.

5. The auger of claim 1, wherein each flight extends to the same radial distance from the center of the cylindrical column around the entire circumference of the flight such that there are no outer edge notches in the flights.

6. The auger of claim 1, wherein successive pairs of flights are positioned at angles of approximately 50 or 60 degrees to one another.

7. The auger of claim 6, wherein three successive pairs of flights together completely extend around the cylindrical column such that the entire circumference of the cylinder is covered by three successive pairs of flights.

8. The auger of claim 1, wherein the auger comprises 2 sets of 3 pairs of flights.

9. The auger of claim 8, wherein the flights on the auger comprises at least 12 sharpened leading edges.

10. The auger of claim 1, wherein the ratio of the outer diameter of the cylindrical column to the outer diameter of the flights is 0.45 to 0.65.

11. The auger of claim 1, wherein the sharpened leading edges are each cut with a 1:7 blade edge.

12. The auger of claim 1, wherein the auger is made of T1 armored steel.

* * * * *